Figure 1:
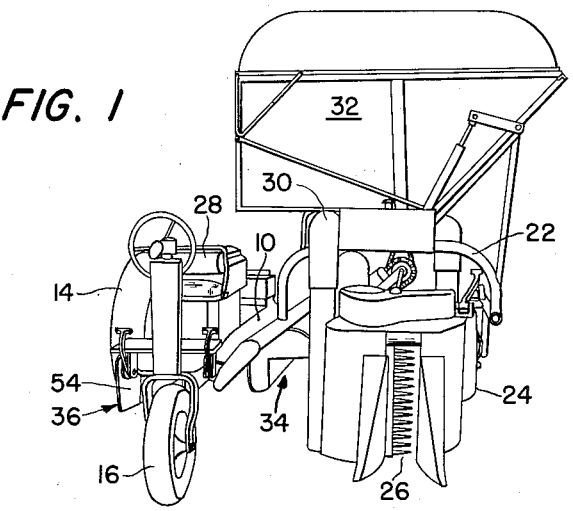

Nov. 4, 1952 F. A. THOMANN 2,616,353
CROP SHIELD FOR HARVESTERS
Filed Aug. 17, 1949

INVENTOR.
F. A. THOMANN
BY
ATTORNEYS

Patented Nov. 4, 1952

2,616,353

UNITED STATES PATENT OFFICE 2,616,353

CROP SHIELD FOR HARVESTERS

Fred A. Thomann, East Moline, Ill., assignor to Deere & Company, Moline, Ill., a corporation of Illinois Application August 17, 1949, Serial No. 110,739

1 Claim. (Cl. 97—192)

This invention relates to a plant or crop shield for use with harvesters or other machines. More particularly, the invention pertains to a novel form of plant shield for protecting the crops or plants in rows near or adjacent to rows of crops being gathered or otherwise operated on by a machine traveling over the field of crops.

The preferred form of the invention was developed primarily for use with harvesters of the cotton picker type and the characteristics of such machine may be taken as exemplary of the applicability of the invention. Cotton plants, like many other crops, are planted in rows and the cotton is picked by a machine having one or more picking units arranged to gather the cotton from such row or rows as the machine travels over the field. Cotton grows to a substantial height and ordinarily the cotton on plants in the rows not being picked is damaged by transversely projecting parts of the machine. Such is definitely the case where the cotton picker is a tractor-mounted unit, since the transverse rear axle of the standard tractor is considerably below the average height of cotton plants.

According to the present invention, there is provided a plant or crop shield in the form of a tunnel disposed lengthwise as respects the line of travel and in alinement with the plants or crops in the row not being picked. The tunnel has a substantially horizontal top wall formed at its front end with a leading wall element and at its rear end with a trailing wall element, both of which are inclined for the purpose of accommodating the plants in that row. The forward wall element is inclined forwardly and upwardly at a relatively abrupt angle so as to deflect the upper portions of the plants forwardly. The top wall of the tunnel is at or below the level of the transverse rear axle, so that the plants are guided smoothly along the undersurface of this top wall. The rear or trailing wall element is inclined upwardly and rearwardly at a relatively gradual angle to the top wall, so that the plants are allowed to escape from the tunnel in a guided or restricted fashion rather than being released suddenly, thus avoiding the loss of cotton from the plants.

It is an object of the invention to provide one or more of these tunnels or shields for protecting the plants in one or more rows not being picked. It is also an object of the invention to provide such shield as a convenient attachment for pickers or harvesters of existing types. It is likewise an object of the invention to provide a tunnel or shield that may be readily adapted to machines of various types for harvesting or otherwise operating on crops or plants other than cotton.

Figure 2:
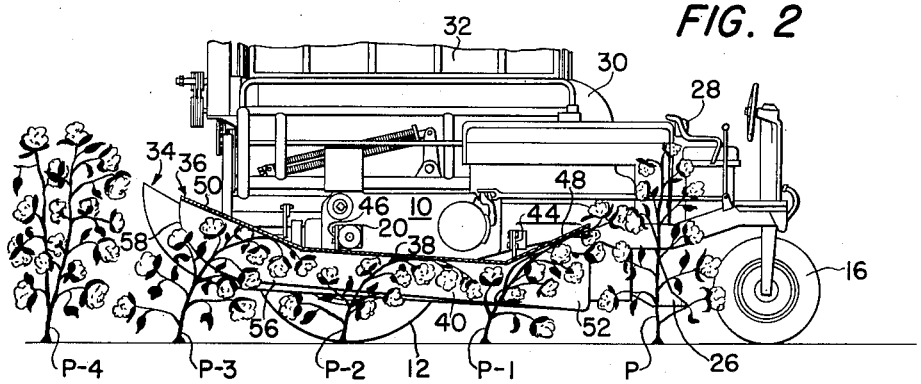
Figure 3:
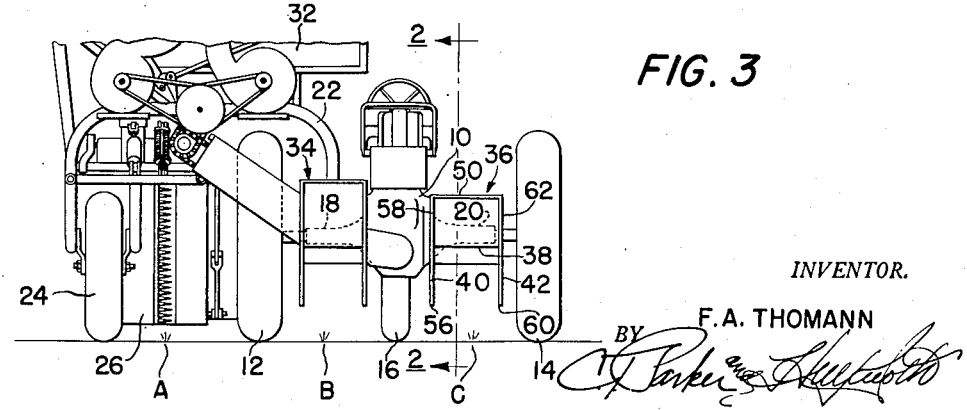

The foregoing and other important objects and desirable features inherent in the invention will become apparent as the disclosure of a preferred form of the invention is made in the following detailed description and accompanying sheet of drawings in which Figure 1 is a perspective view of a one-row, tractor-mounted cotton picker;

Figure 2 is a side elevational view, partly in section, along line 2—2 of the picker shown in Figure 3, the upper portion of the picker basket being eliminated from the view and the outer tunnel or shield being shown in longitudinal section; and Figure 3 is a rear view of the picker unit.

The tractor-mounted picker selected for the purposes of illustration is merely representative of one type of mobile frame adapted to travel over a field of standing row crops and having means for operating on crops in at least one row to the exclusion of crops in a nearby row. The tractor comprises an elongated body or main frame 10 carried on relatively widely spaced apart rear traction wheels 12 and 14 and a single steerable front wheel 16. The rear traction wheels are part of the usual transverse rear axle structure of the tractor, here shown as comprising left- and right-hand transverse axle housings 18 and 20 (Figures 2 and 3). These housings constitute parts disposed transverse to the line of travel of the frame or vehicle and as such are apt to contact crops or plants in rows not being operated upon.

The tractor-mounted picker shown is of the semi-mounted type including an auxiliary frame 22 carried at its inner side by the tractor body 10 and at its outer side by an outboard wheel 24. The auxiliary frame carries a picker unit, designated generally by the numeral 26, which constitutes means for operating on plants or crops in one row. The picking unit is merely representative of many forms that such unit could assume and as such forms no part of the present invention.

In Figure 3, the letters A, B and C designate the schematic illustration of three spaced-apart crop rows. It will be seen that the picker unit 26 is operating to gather plants or crops from the row A, whereas the rows B and C are straddled by the tractor, the front wheel 16 operating between the rows B and C and the traction wheels 12 and 14 operating respectively outside the rows B and C, the importance of which in connection with the present invention will be presently brought out.

As stated above, the general construction of the picker is not material except as a representative form of structure in conjunction with which the present invention may be used. The tractor may be guided by an operator who sits on a forwardly located operator's seat 28 so that he may have a complete view of the row A along which the picker unit 26 is operating. Cotton picked from the row A is ultimately delivered by pneumatic means including a duct 30 to a receptacle in the form of a basket 32 carried by the auxiliary frame 22.

Figure 2 illustrates the plant or shield structure and its function in guiding and protecting plants in the rows B and C; that is, the rows not presently being operated upon by the picker unit 26. In the present case, there are two crop or plant shields, designated by the numerals 34 and 36, positioned to accommodate respectively the rows B and C. Since these two shields are similar, with the exception of a few differences that will be noted below, only the right-hand shield 36 will be described in detail. This shield is shown in longitudinal section in Figure 2.

It will be apparent from an examination of Figure 2 that the transverse part comprising the rear axle housing 20 is at a level substantially lower than the tops of the crops or cotton plants. The letter P designates the first plant in the series shown in Figure 2, the successive plants in rearward progression being designated respectively by the letters P-1, P-2, P-3 and P-4. The plant or crop shield 36 is in the form of an elongated tunnel having a top wall 38 and inner and outer side walls 40 and 42, which three walls form an intermediate tunnel section constituting a major portion of the length of the structure 36 and which is of substantially uniform cross-sectional shape throughout. The top wall 38 is provided with a pair of longitudinally spaced-apart brackets 44 and 46 which comprise means for mounting the tunnel or shield on the frame or vehicle lengthwise as respects the line of travel and in line with the row C, with the top wall generally horizontal and substantially at the level of the transverse axle housing 20 and with both the top and side walls extending ahead of and behind the transverse axle housing to accommodate the crops or plants in the row C. In the present case, the brackets 44 and 46 are secured respectively to the tractor body 10 and to the rear axle housing 20. The other shield 34 may be similarly mounted.

That portion of the top wall 38 ahead of the transverse axle housing 20 has a contiguous leading or front wall element 48 which inclines forwardly and upwardly to a level above that of the rear axle housing 20. That portion of the top wall 38 behind the axle housing has a rear or trailing wall element 50 which is contiguous with the top wall and which inclines upwardly and rearwardly to a level above that of the axle housing. It will be noted that the angle of inclination of the leading wall element 48 to the top wall 38 is relatively abrupt, whereas the angle of inclination of the trailing wall element 50 to the top wall 38 is relatively gradual. This arrangement is for the purpose of receiving, guiding and releasing the plants, as will be brought out below.

Each of the side walls 40, 42 adjoins and depends from the top wall 38. The forward portion of the side wall 40 is extended forwardly to adjoin the leading wall element 48 and has increased vertical dimension, as designated by the numeral 52 in Figure 2. The outer side wall 42 is similarly formed, as will be apparent at 54 in Figure 1, these wall portions 52 and 54 forming with the wall portion 48 a front plant-receiving section for the tunnel 36. The side wall 40 has a lower edge 56 which is generally straight, spaced below and substantially coextensive with and parallel to the top wall 38 plus the leading wall element 48. The rear portion of the lower edge of the wall 40 curves upwardly and rearwardly, at 58, substantially coextensive with the trailing wall element 50. The outer wall 42 is similarly constructed, the straight edge being designated by the numeral 60 in Figure 3 and the curved portion of the edge being designated at 62 in the same figure, thereby giving each of the side portions of the rear section 58—58—62 a rearwardly diminishing area.

The increased vertical dimensions of the side walls 40 and 42 respectively at 52 and 54 provide, in conjunction with the leading wall element 48, a funnel which is adapted to receive the plants as the machine moves forwardly. Although the leading edge of the leading wall element 48 is somewhat below the top of the plant P, the funnel effect is sufficient to accommodate the plant, as will be apparent from the manner in which the plane P-1 is deflected. Figure 2 shows that the plant P-2 is further deflected as it passes under the generally horizontal top wall 38. This figure further shows the gradual release of the plant P-3. That is, the plant is allowed to ride up the inclined trailing wall element 50 so that it is gradually released from the tunnel to assume the upright position of the plant P-4. This avoids the sudden release that would necessarily obtain were the plants engaged directly by a transverse part such as the axle housings 18 and 20. The gradual release of the plants from the tunnels prevents loss of cotton and damage to the stalks of the plants. The relatively smaller area of the rear portions of the side walls, formed by the curved edges at 58 and 62, further accommodates the gradual release of the plants, since the plants are allowed to spread sidewise as well as upwardly.

As previously noted, the tunnels 34 and 36 are of substantially identical construction. It will be noted, however, that the tunnel 34 extends slightly further rearwardly than does the tunnel 36. This is a feature that may be adopted to prevent entanglement of plants in adjacent rows that might be caused by simultaneous release of such plants from the adjoining tunnel structure.

Various objects and features of the invention not specifically enumerated above will occur to those versed in the art, as likewise will numerous modifications and alterations in the preferred structure illustrated, all of which may be achieved without departing from the spirit and scope of the invention as defined in the appended claim.

What is claimed is:

A crop shield of the character disclosed, comprising: an elongated tunnel having a front section, an intermediate section and a rear section contiguously arranged so that crops are received via the front section, pass through the intermediate section and escape via the rear section; said intermediate section comprising a major portion of the length of the tunnel and each of the front and rear sections being relatively short compared to the intermediate section; said intermediate section being of substantially uniform cross-sectional shape throughout its length and having a top wall portion and a pair of depending side wall portions, each of the latter terminating in lower edges substantially parallel to the top wall section; said front section having a top wall portion adjoining and extending forwardly and upwardly from the top wall portion of the intermediate section and further having a pair of depending side wall portions extending forwardly generally as continuations of the side wall portions of the intermediate section and terminating in lower edges respectively as continuations of the lower edges of the side wall portions of the intermediate section; and said rear section having a top wall portion adjoining and extending rearwardly and upwardly from the top wall portion of the intermediate section to a rear terminal edge above the level of and rearwardly of the intermediate section top wall portion and further having a pair of depending side wall portions, each of the latter having lower edges respectively adjoining and extending upwardly and rearwardly from the lower edges of the side wall portions of the intermediate section into proximity to the aforesaid rear terminal edge of the rear section top wall portion so that each of said rear section side wall portions has a rearwardly diminishing area.

FRED A. THOMANN.

REFERENCES CITED

The following references are of record in the file of this patent:

UNITED STATES PATENTS

| Number | Name | Date |
|---|---|---|
| 1,384,411 | Springer | July 12, 1921 |
| 1,785,588 | McClain | Dec. 16, 1930 |
| 1,946,542 | Neighbour et al. | Feb. 13, 1934 |
| 2,201,463 | Williams et al. | May 21, 1940 |
| 2,349,905 | Hyman | May 30, 1944 |